United States Patent Office 2,784,644
Patented Mar. 12, 1957

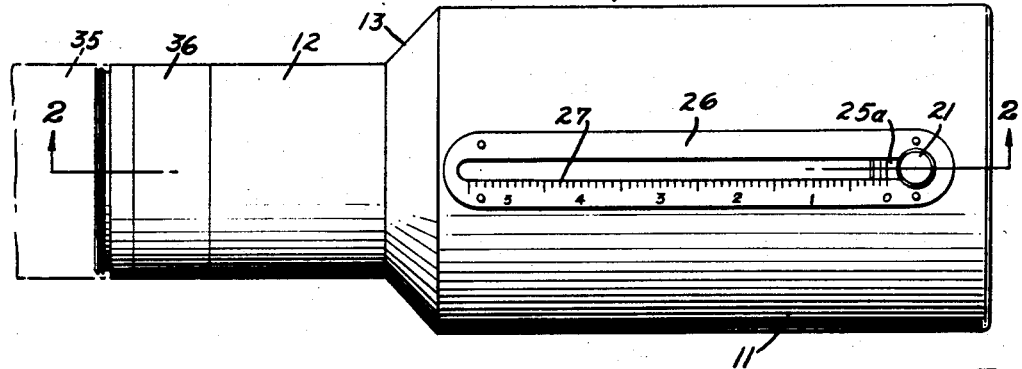
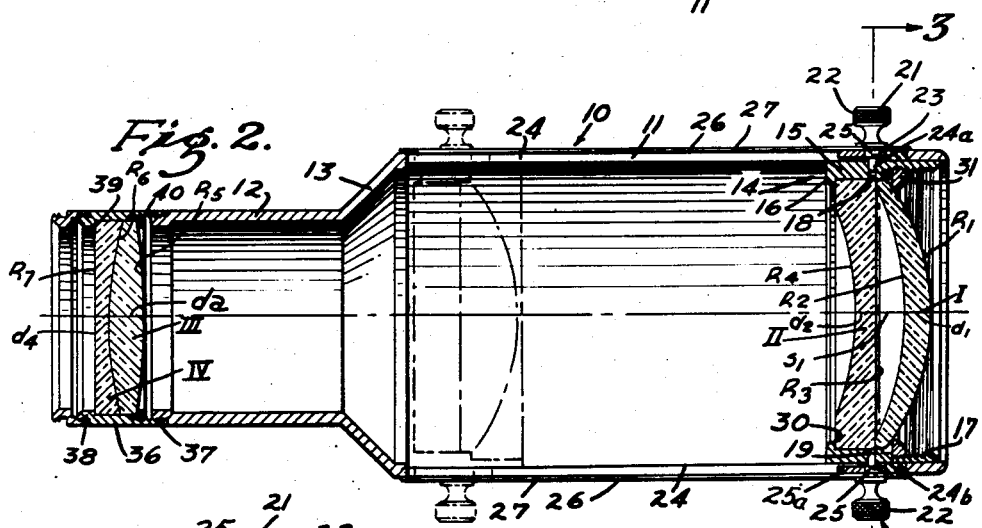
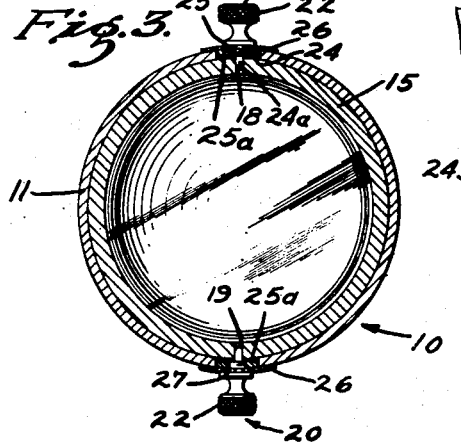
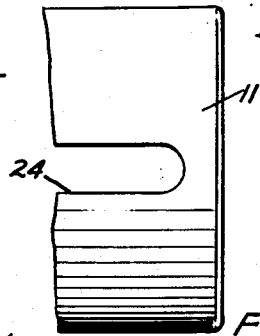
Felix L. Bednarz
INVENTOR.

2,784,644

OPTICAL SYSTEM ATTACHMENT OF VARIABLE FOCUS FOR CAMERA AND PROJECTOR OBJECTIVES

Felix L. Bednarz, Beverly Hills, Calif., assignor to McCulloch Motors Corporation, Los Angeles, Calif., a corporation of Wisconsin Application October 26, 1953, Serial No. 388,290

2 Claims. (Cl. 88—57)

This invention relates to optical systems suitable for photographic or projecting purposes and, more particularly, it relates to a variable focus attachment for cameras or projectors having a construction such that pictures taken or projected therewith may be made to appear to have been taken or to have been projected from different distances or continuously changing distances from the subject.

It is an object of the invention to provide a novel variable focus attachment for cameras or projectors including novel means for changing the over-all magnification by shifting the position of only one lens or one group of lenses carried by the attachment.

It is another object of the invention to provide a novel variable focus attachment for cameras or projectors having a novel construction for reducing the over-all length of the system of lenses in the optical system.

It is another object of the invention to provide a novel variable focus attachment for a projector or a camera in which novel means are provided for locking the one shiftable lens or lens group in any one position between end limits on the optical axis so as to obtain desired over-all magnification of the image.

It is a further object of the invention to provide a novel variable focus attachment for a projector or a camera having a novel negative lens which may be shifted axially relative to a camera or projector objective, the negative lens comprising a combination of lens elements by means of which optical aberrations are corrected for.

Other features will be brought out in the following part of the specification.

Referring to the drawings,

Fig. 1 is a view of the variable focus attachment taken in elevation;

Fig. 2 is an elevational view of the attachment taken in section;

Fig. 3 is a cross-sectional view of the variable focus attachment taken on line 3—3 of Fig. 2; and Fig. 4 is an elevational view of the end portion of the attachment.

Referring now to the drawings, the numeral 10 designates a lens barrel having a front cylindrical portion 11 and a rear cylindrical portion 12 of reduced diameter, the two cylindrical portions being joined by a tapered wall portion 13. Positioned within the forward cylindrical portion 11 is a forward lens assembly 14 which includes a cylindrical lens mount 15 having an annular shoulder 16 at the rear or leftward end thereof and having a threaded forward portion 17. The lens mount has formed therein two oppositely positioned laterally extending apertures 18 and 19. The lens mount is adapted to slide axially within the cylindrical forward portion 11 of the barrel head in closely fitting relationship therewith.

Means are provided for controllably shifting and frictionally connecting the lens mount with respect to the cylindrical portion 11. This means includes a pair of thumb screws 20 and 21, each of which has a knurled head 22 projecting outwardly from barrel portion 11, and a shank portion 23 extending laterally inwardly through slots 24 which extend longitudinally in the barrel portion 11 and are positioned diametrally oppositely from one another. The end portion 24a of each shank 23 is adapted to fit snugly within the aperture 18 formed in the lens mount. The intermediate portion 25 of each shank is threaded and engages a nut plate 25a which is positioned within the slot 24 and has a width equal to the width of the slot so that the nut plate may be guided in the slot when the lens mount is moved longitudinally or axially in the cylindrical barrel portion 11. A rubber stop member 24b is positioned at the forward end of each of the slots 24 to limit forward movement of the nut plates.

A thin plate 26 is fastened to the surface of the barrel portion 11 over the slot 24 and under the knurled head of the thumb screw. The plate 26 also has a longitudinally extending slot 27 formed therein, the slot having a width which is less than the width of the slot 24 in the barrel portion 11 so that the knurled head may be caused to frictionally engage the surface of the plate 26 when the heat is tightened to cause the nut plate to clamp the underside of the thin plate 26.

The forward lens assembly also includes a lens group combination having a negative focal length. The lens group includes a front lens I which is a positive lens element and will be recognized by those skilled in the art as a meniscus lens. The rear lens of the group is a negative lens element and will be recognized as a plano concave lens. These two lenses are mounted within the lens mount in the position shown in Fig. 2 with the rim portion 30 of lens element II engaging shoulder 16 of the lens mount. The lenses are held in position by means of a retaining ring 31 which is an annular member threaded on its outer diameter and is adapted to threadably engage the threaded portion 17 of the lens mount.

The lens group is optically corrected for aberrations and is adapted to be used in conjunction with the objective lens of either a camera or a projector. The particular optical system illustrated in Fig. 2 includes a projection lens 35 outlined in dotted lines. The variable focus attachment 10 may be threadedly attached to the barrel of the projection system. However, another lens group such as the lenses III and IV may be interposed between the projection lens 35 and the second cylindrical portion 12 of the barrel 10 in order that the focal length of the projection lens might be reduced. The lens elements III and IV may be a positive lens mounted within the barrel 36 which has diametrally threaded portions 37 and 38 formed therein at the forward and rearward ends thereof. The lenses III and IV are held in position by any convenient means such as the shoulder 39 formed in the barrel 36 and by the retaining ring 40.

A particular variable focus negative lens attachment adapted to be attached to a 35 mm. film projector has characteristics in accordance with the following table. The focal length of this negative lens is 12 inches. The diameter of the negative lens is 3.500 inches. The characteristics of the positive lens comprising the lens elements III and IV are also given in the following table, and the focal length of the positive lens doublet is 18 inches.

| Lens | Radii | Thickness | Glass | |
|---|---|---|---|---|
| | | | $N_D$ | V |
| I | $R_1=2.850$ | $d_1=0.360$ | 1.689 | 30.9 |
| | $R_2=3.700$ | | | |
| II | $R_3=$ infinite | $d_2=0.250$ | 1.611 | 57.2 |
| | $R_4=3.700$ | | | |
| III | $R_5=9.34$ | $d_3=0.430$ | 1.605 | 37.9 |
| | $R_6=5.47$ | | | |
| IV | $R_7=$ infinite | $d_4=0.2$ | 1.573 | 57.4 |

In the above table $R_1$, $R_2$, etc. indicate the radii of the individual lens surfaces counting from the front as indicated on the drawing and $d_1$, $d_2$, etc. indicate the axial thickness of the individual four elements. As to the glass characteristics in the above table, $N_D$ is the index of refraction for the D line of the spectrum and V is the dispersive index of the glass used in each element. Optical glasses having code numbers comparable to the glass characteristics given above are listed in the Precision Optical Glass Catalog No. 2, November 1950, of Hayward Scientific Glass Corporation, Whittier, California. The axial air separation of lenses I and II, designated $s_1$ on the drawing, is 0.40 inch.

It has been found that axial shifting of the position of the particular negative lens described resulted in a variation in the focal length of the entire system, including the camera or projector objective and the doublet combination having a back focal length of 3¾ inches, of from 3½ inches to 2½ inches. This shifting resulted in increase in the lateral magnification of the image size by a factor of 1.8.

It is pointed out that the variable focal length attachment is not considered to be a "zoom" lens attachment since the back focal length of the system is not kept constant.

The focal length of the entire system is varied to achieve magnification of the image by shifting only one lens element, namely the front or negative lens element. It is also pointed out that the particular negative lens having the radii specified above has a comparatively small focal length which enables the over-all length of the optical system, and therefore the length of the lens barrel, to be reduced.

The focal length of the optical system is changed but only a small amount by such shifting of the position of the negative lens, and may then be compensated for by shifting the entire lens system forwardly or rearwardly to bring the image plane into coincidence with the camera or projector film. It is readily apparent that the variable focus attachment provides a simplified and advantageous means for achieving variable magnification.

I claim:
1. An optical system of variable equivalent focal length including: a projector objective; an optical attachment in front of said objective including a positive lens adapted to reduce the focal length of said projector objective; a pair of lenses defining a negative lens group, one of which is a positive lens and one of which is a negative lens, a lens mount having said lens group fixably mounted therein; means for shifting the axial position of said negative lens group to vary the magnification of said optical system including a lens barrel enclosing said lens mount, a longitudinally extending slot in said lens barrel, and means positioned in said slot and engaging said lens mount and said barrel for slidably adjusting the position of said lens mount in said barrel and fixing said mount in position in said barrel, said negative lens group having substantially the following characteristics:

| Lens | Glass | | Thickness | Radii |
|---|---|---|---|---|
| | $N_D$ | V | | |
| I | 1.689 | 30.9 | $d_1=0.36$ | $R_1=2.850$ |
| | | | | $R_2=3.700$ |
| | | | $s_1=0.40$ | |
| | | | | $R_3=$ infinite |
| II | 1.611 | 57.2 | $d_2=0.25$ | $R_4=3.700$ | where the lenses are numbered from front to rear, $N_D$ is the refractive index for the D line of the spectrum, V is the dispersive index, $d$ is the thickness of the respective lenses, R denotes the radii of the surfaces and $s_1$ denotes the axial surface spacing between lenses I and II.

2. An auxiliary optical attachment for use with a projector objective comprising a lens barrel having a front cylindrical portion and a rear cylindrical portion, said cylindrical portions being joined in axially aligned relation, a positive lens component mounted within and adjacent the end of said rear cylindrical portion, said end of said rear cylindrical portion having means for securing said attachment in front of a projector objective, a ring shaped lens mount slidably received in said front cylindrical portion, a negative lens component including a positive lens and a negative lens mounted within said lens mount, said front cylindrical portion having a pair of diametrically opposite slots extending longitudinally and axially for a major portion of the length thereof, a pair of actuating members engaged with opposite sides of said lens mount and extending outwardly through the diametrically opposite slots in said front cylindrical portion, said actuating members being operable to effect axial movement of said lens mount and the lenses carried thereby relative to said positive lens component to vary the focal length of the entire system including the projector objective, positive lens component and negative lens component, whereby said negative lens component may be moved in said lens barrel from a position of minimum magnification to a position of maximum magnification, said actuating members having means to secure said lens mount and the lenses carried thereby in the desired position within said front cylindrical portion relative to the positive lens component within said rear cylindrical portion of said lens barrel.

References Cited in the file of this patent

UNITED STATES PATENTS

| | | |
|---|---|---|
| 756,779 | Dallmeyer | Apr. 5, 1904 |
| 1,802,100 | Wolfe | Apr. 21, 1931 |
| 1,934,561 | Rayton | Nov. 7, 1933 |
| 1,955,590 | Lee | Apr. 17, 1934 |
| 2,184,018 | Ort | Dec. 19, 1939 |
| 2,324,057 | Bennett | July 13, 1943 |
| 2,582,085 | Tolle | Jan. 8, 1952 |

FOREIGN PATENTS

| | | |
|---|---|---|
| 578,134 | France | June 24, 1924 |
| 234,823 | Great Britain | Dec. 17, 1925 |
| 605,884 | France | Feb. 26, 1926 |
| 612,264 | France | July 26, 1926 |
| 722,817 | France | Jan. 5, 1932 |
| 878,741 | France | Oct. 26, 1942 |